(12) United States Patent
Catherall

(10) Patent No.: US 11,149,653 B2
(45) Date of Patent: Oct. 19, 2021

(54) BLEED VALVE ACTUATION SYSTEM HAVING SPLIT RING SEGMENTS AND SPLICE BRACKET

(71) Applicant: United Technologies Corporation, Farmington, CT (US)

(72) Inventor: Michael John Robert Catherall, Middletown, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 500 days.

(21) Appl. No.: 16/103,175

(22) Filed: Aug. 14, 2018

(65) Prior Publication Data
US 2020/0056548 A1 Feb. 20, 2020

(51) Int. Cl.
| | |
|---|---|
| *F02C 9/18* | (2006.01) |
| *F01D 17/10* | (2006.01) |
| *F01D 9/04* | (2006.01) |
| *F01D 17/12* | (2006.01) |
| *F01D 17/14* | (2006.01) |
| *F02C 6/08* | (2006.01) |
| *F04D 29/64* | (2006.01) |

(Continued)

(52) U.S. Cl.
CPC .................. *F02C 9/18* (2013.01); *F01D 9/04* (2013.01); *F01D 17/105* (2013.01); *F01D 17/12* (2013.01); *F01D 17/141* (2013.01); *F02C 6/08* (2013.01); *F04D 27/0215* (2013.01); *F04D 29/524* (2013.01); *F04D 29/644* (2013.01)

(58) Field of Classification Search
CPC .. F02C 6/08; F02C 9/18; F01D 17/105; F01D 17/14; F01D 17/141; F01D 17/148; F01D 9/04; F04D 27/0207; F04D 27/0215; F04D 29/524
See application file for complete search history.

(56) References Cited

U.S. PATENT DOCUMENTS 3,074,432 A * 1/1963 Beale .................... F04D 27/023
137/625.28
4,785,624 A * 11/1988 Smith ..................... F01D 25/12
60/806

(Continued)

FOREIGN PATENT DOCUMENTS

| EP | 3358149 A1 | 8/2018 |
|---|---|---|
| FR | 2931522 B1 | 3/2013 |
| WO | 2013192064 A1 | 12/2013 |

OTHER PUBLICATIONS

European Search Report for European Application No. 19191815. 0-1004, dated Jan. 9, 2020, 5 pages.

*Primary Examiner* — Alain Chau
(74) *Attorney, Agent, or Firm* — Cantor Colburn LLP

(57) ABSTRACT

A bleed valve assembly of a gas turbine engine includes two or more valve segments extending circumferentially around a central longitudinal axis of the gas turbine engine, and a first splice bracket spanning a first joint between a first valve segment and a second valve segment of the two or more valve segments. The first splice is bracket secured to the first valve segment and the second valve segment. A second splice bracket spans a second joint between the first valve segment and the second valve segment. The second splice bracket is secured to the first valve segment and the second valve segment.

16 Claims, 7 Drawing Sheets

(51) Int. Cl.
    *F04D 27/02*     (2006.01)
    *F04D 29/52*     (2006.01)

(56) References Cited

U.S. PATENT DOCUMENTS

| | | | |
|---|---|---|---|
| 6,048,171 A * | 4/2000 | Donnelly | F01D 17/105 |
| | | | 137/601.05 |
| 6,161,839 A | 12/2000 | Walton et al. | |
| 7,581,382 B2 * | 9/2009 | Sadil | F02C 7/12 |
| | | | 60/232 |
| 7,850,419 B2 | 12/2010 | Vrljes et al. | |
| 8,075,246 B2 * | 12/2011 | Albert | F04D 27/023 |
| | | | 415/39 |
| 8,152,460 B2 * | 4/2012 | Brunet | F04D 29/545 |
| | | | 415/201 |
| 8,337,140 B2 | 12/2012 | Colotte et al. | |
| 8,690,521 B2 | 4/2014 | Colotte et al. | |
| 9,097,137 B2 | 8/2015 | Suciu et al. | |
| 9,121,465 B2 | 9/2015 | Wright et al. | |
| 9,328,735 B2 * | 5/2016 | LeBlanc | F04D 29/644 |
| 9,964,223 B2 | 5/2018 | Coretto et al. | |
| 10,473,036 B2 * | 11/2019 | Little | F04D 27/0215 |
| 2004/0096315 A1 | 5/2004 | Chlus | |
| 2013/0343883 A1 * | 12/2013 | LeBlanc | F04D 29/023 |
| | | | 415/182.1 |
| 2015/0027130 A1 | 1/2015 | Leblanc et al. | |
| 2018/0223741 A1 * | 8/2018 | Little | F01D 17/141 |

* cited by examiner

BLEED VALVE ACTUATION SYSTEM HAVING SPLIT RING SEGMENTS AND SPLICE BRACKET

BACKGROUND

Exemplary embodiments of the present disclosure pertain to the art of gas turbine engines. More particularly, the present disclosure relates to bleed valves of gas turbine engines.

Gas turbine engines are known and typically include a fan delivering air into a bypass duct as propulsion air. Further, the fan delivers air into a compressor section where it is compressed. The compressed air passes into a combustion section where it is mixed with fuel and ignited. Products of this combustion pass downstream over turbine rotors driving them to rotate.

In a gas turbine engine, bleed airflow is often provided from the compressor to generate electrical power, provide airflow for aircraft cabin pressurization, and to provide cooling to downstream hot-section components, such as combustor and turbine components. The bleed airflow is controlled by a bleed airflow valve actuated through a full hoop valve ring.

BRIEF DESCRIPTION

In one embodiment, a bleed valve assembly of a gas turbine engine includes two or more valve segments extending circumferentially around a central longitudinal axis of the gas turbine engine, and a first splice bracket spanning a first joint between a first valve segment and a second valve segment of the two or more valve segments. The first splice is bracket secured to the first valve segment and the second valve segment. A second splice bracket spans a second joint between the first valve segment and the second valve segment. The second splice bracket is secured to the first valve segment and the second valve segment.

Additionally or alternatively, in this or other embodiments one or more linkage brackets are secured to the first valve segment and/or the second valve segment.

Additionally or alternatively, in this or other embodiments the first joint and the second joint are positioned 180 degrees apart.

Additionally or alternatively, in this or other embodiments each of the valve segments of the two or more valve segments includes a plurality of segment bosses protruding radially from the valve segments.

Additionally or alternatively, in this or other embodiments the first splice bracket and the second splice bracket are secured to the valve segments at the plurality of segment bosses.

Additionally or alternatively, in this or other embodiments each of the two or more valve segments each include a radial stiffening rib extending circumferentially along the valve segment.

Additionally or alternatively, in this or other embodiments the radial stiffening rib extends along an entire circumferential length of the valve segment.

Additionally or alternatively, in this or other embodiments each of the two or more valve segments each include one or more axial stiffening ribs extending from a forward segment end to rearward segment end.

Additionally or alternatively, in this or other embodiments the first splice bracket includes a bell crank clevis receptive of a bell crank for operation of the bleed valve.

Additionally or alternatively, in this or other embodiments the second splice bracket includes a sync clevis receptive of a linkage for operation of the bleed valve.

In another embodiment, a gas turbine engine includes a combustor, and a compressor located upstream of the combustor and in fluid communication therewith. The compressor includes a bleed port to divert pressurized airflow from a main flowpath of the gas turbine engine. The flow through the bleed port is controlled by a bleed valve. The bleed valve includes two or more valve segments extending circumferentially around a central longitudinal axis of the gas turbine engine, and a first splice bracket spanning a first joint between a first valve segment and a second valve segment of the two or more valve segments. The first splice bracket is secured to the first valve segment and the second valve segment. A second splice bracket spans a second joint between the first valve segment and the second valve segment. The second splice bracket is secured to the first valve segment and the second valve segment.

Additionally or alternatively, in this or other embodiments one or more linkage brackets are secured to the first valve segment and/or the second valve segment.

Additionally or alternatively, in this or other embodiments the first joint and the second joint are positioned 180 degrees apart.

Additionally or alternatively, in this or other embodiments each of the valve segments of the two or more valve segments includes a plurality of segment bosses protruding radially from the valve segments.

Additionally or alternatively, in this or other embodiments the first splice bracket and the second splice bracket are secured to the valve segments at the plurality of segment bosses.

Additionally or alternatively, in this or other embodiments each of the two or more valve segments each include a radial stiffening rib extending circumferentially along the valve segment.

Additionally or alternatively, in this or other embodiments the radial stiffening rib extends along an entire circumferential length of the valve segment.

Additionally or alternatively, in this or other embodiments each of the two or more valve segments each include one or more axial stiffening ribs extending from a forward segment end to rearward segment end.

Additionally or alternatively, in this or other embodiments the first splice bracket includes a bell crank clevis receptive of a bell crank for operation of the bleed valve.

Additionally or alternatively, in this or other embodiments the second splice bracket includes a sync clevis receptive of a linkage for operation of the bleed valve.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
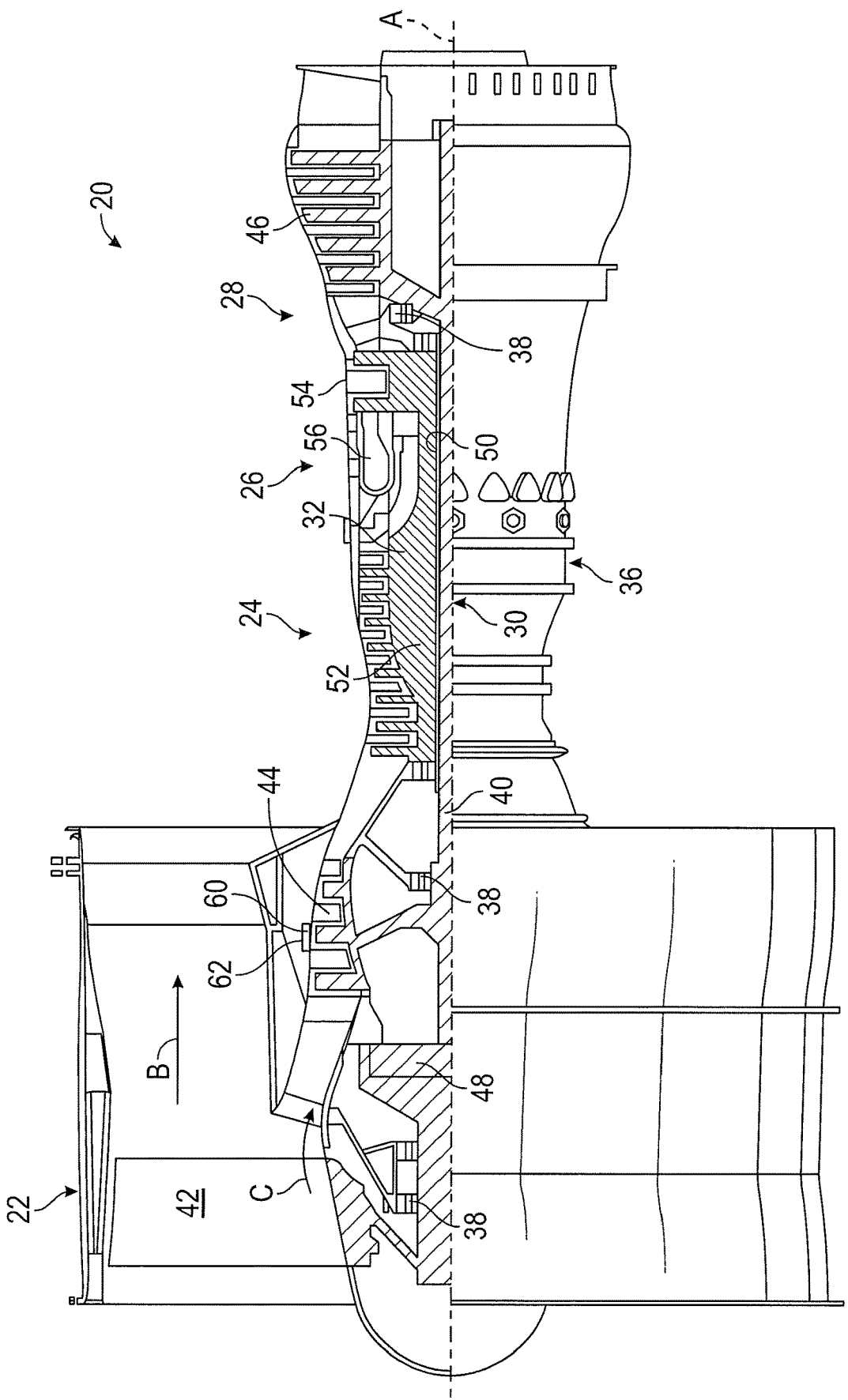
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

The gas turbine engine 20 utilizes bleed airflow directed through one or more bleed ports 60 for, for example, electrical power generation and/or aircraft cabin pressurization. The bleed airflow through the one or more bleed ports 60 is controlled by a bleed valve 62.

Figure 2:
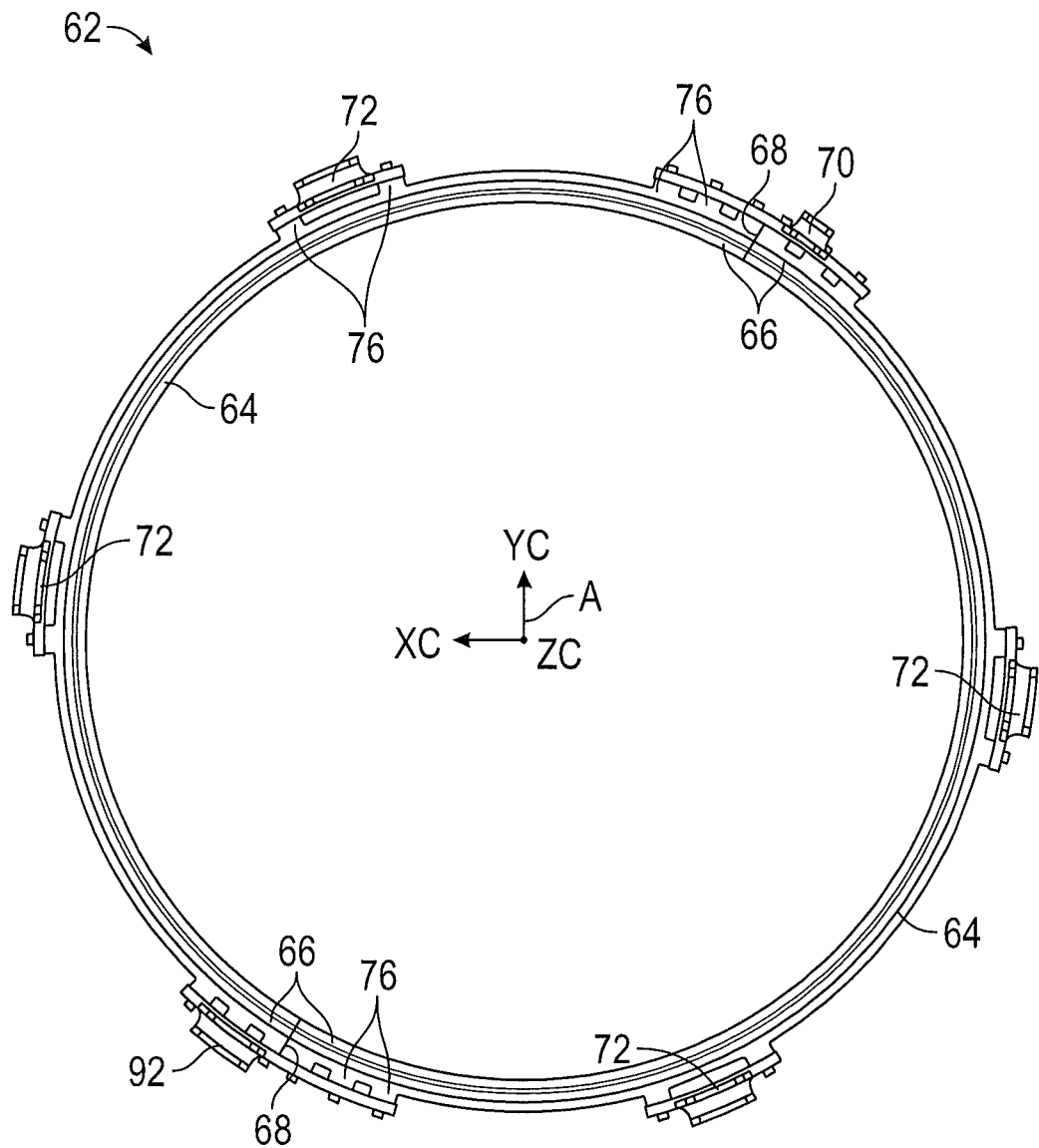
FIG. 2 is a forward looking aft view of an embodiment of a bleed valve.
Figure 3:
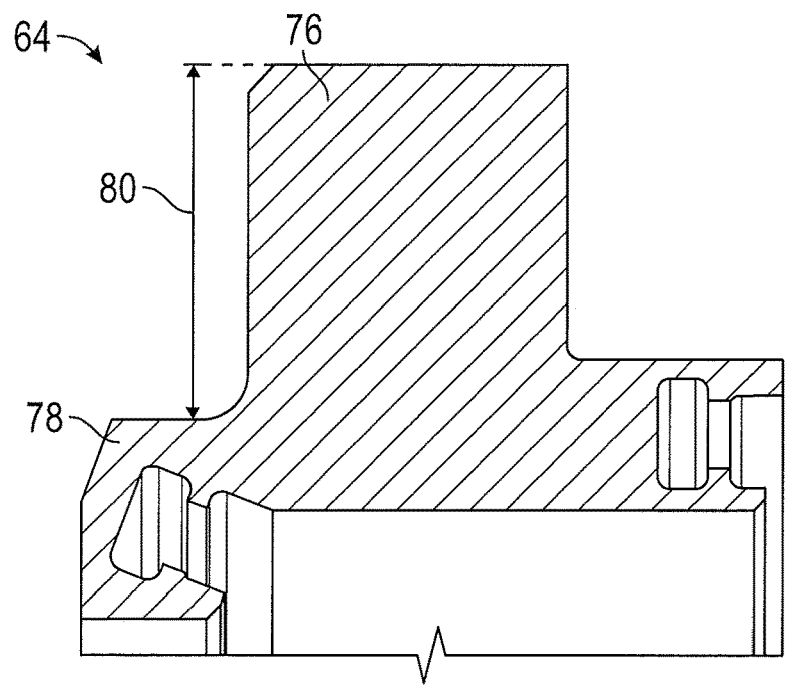
FIG. 3 is a cross-sectional view of an embodiment of a segment boss of a bleed valve.

An embodiment of a bleed valve 62 is illustrated in FIG. 2. The bleed valve 62 includes two valve segments 64 arranged around the engine central longitudinal axis A. Segment ends 66 of the valve segments 64 abut at two segment joints 68, which in some embodiments are located 180 degrees apart. The valve segments 64 are connected via a first splice bracket, such as a bell crank bracket 70 and a second splice bracket, such as a sync bracket 92, each located to span the segment ends 66. Further, linkage brackets 72 are secured to the valve segments 64. In some embodiments, two linkage brackets 72 are secured to each valve segment 64. To secure the bell crank bracket 70, the sync bracket 92 and the linkage brackets 72 at the valve segments 64, the valve segments 64 include a plurality of segment bosses 76, and a cross-section of an exemplary segment boss 76 is illustrated in FIG. 3. The segment boss 76 protrudes radially outwardly from a segment outer surface 78 to a selected boss height 80.

Figure 4:
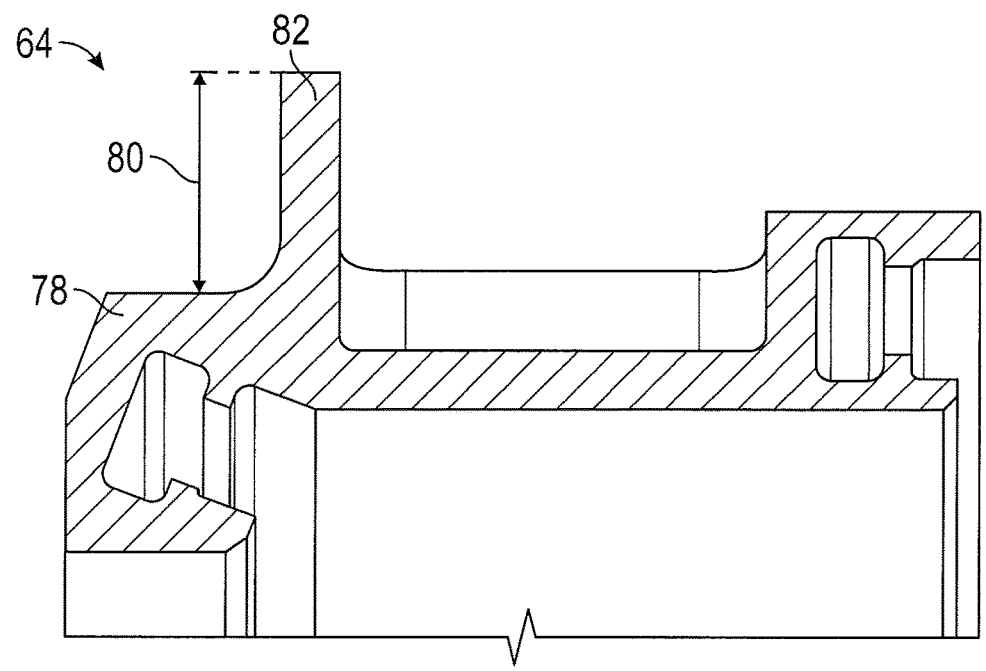
FIG. 4 is a cross-sectional view of an embodiment of a valve segment having a radial stiffening rib.

The valve segments 64 include features to increase stiffness of the bleed valve 62, since the stiffening full hoop valve ring is not utilized. Referring to FIG. 4, each valve segment 64 includes a radial stiffening rib 82 that extends circumferentially along the valve segment 64, in some embodiments extending the entire 180 degree arc of the valve segment 64. The radial stiffening rib 82 has a radial rib height 84 from the segment outer surface 78, which is less than the boss height 80.

Figure 5:
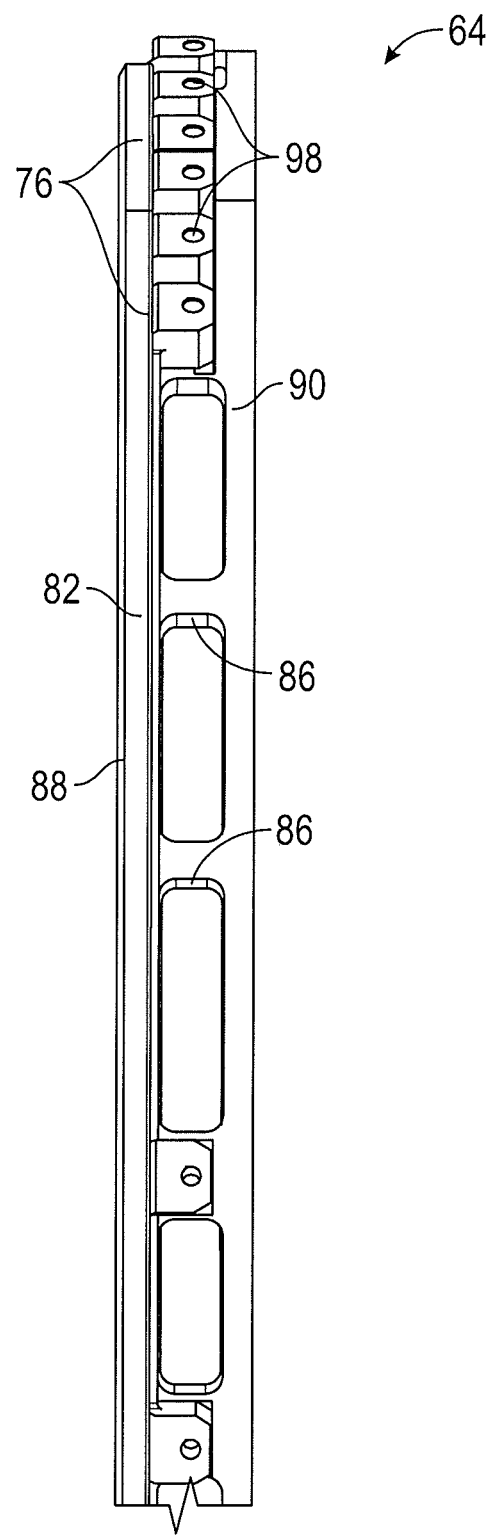
FIG. 5 is a cross-sectional view of an embodiment of a valve segment having an axial stiffening rib.

As shown in FIG. 5, each valve segment 64 includes one or more axial stiffening ribs 86 extending from a forward end 88 of the valve segment 64 to an aft end 90 of the valve segment 64. In some embodiments, there are five axial stiffening ribs 86 is each valve segment 64.

Figure 6:
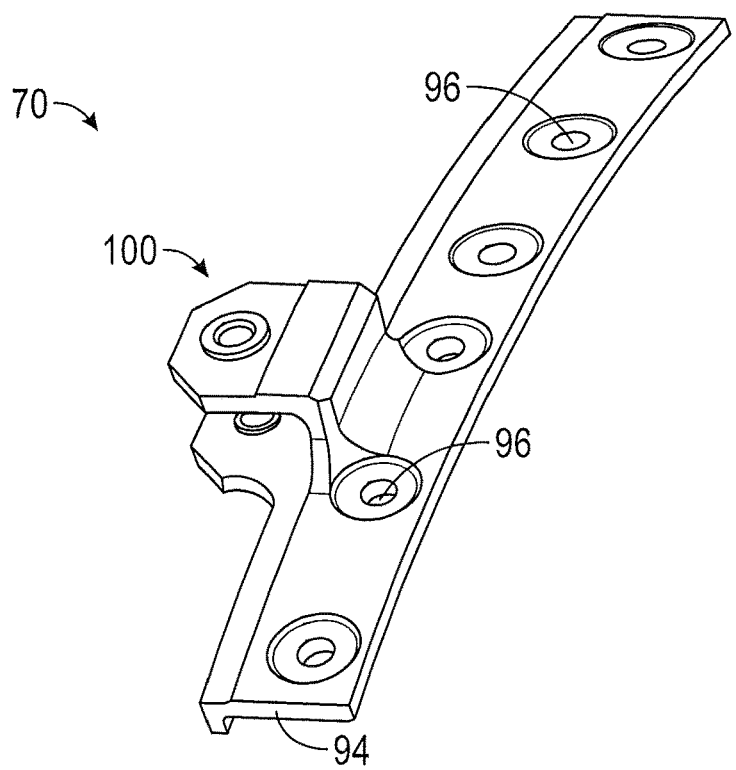
FIG. 6 is a perspective view of an embodiment of a bell crank bracket.
Figure 7:
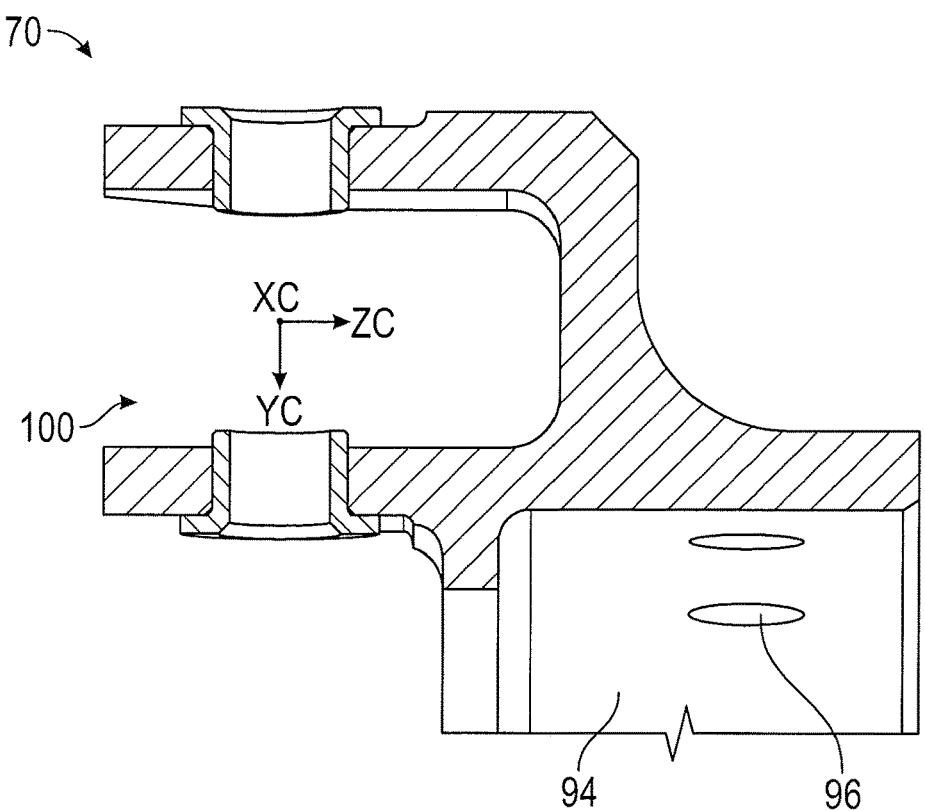
FIG. 7 is a cross-sectional view of an embodiment of a bell crank bracket.

Referring now to FIGS. 6 and 7, an embodiment of a bell crank bracket 70 is illustrated. The bell crank bracket 70 includes a bracket inner surface 94 that interfaces with the valve segments 64 at the segment bosses 76. In the embodiment illustrated, the bell crank bracket 70 is secured to the valve segments 64 by six fasteners (not shown) extending through six bracket holes 96, with each bracket hole 96 corresponding to a boss opening 98 (shown in FIG. 5) of each segment boss 76. It is to be appreciated that while six bracket holes 96 are illustrated, other quantities of bracket holes 96 may be included in the bell crank bracket 70 and utilized to secure the bell crank bracket 70 to the valve segments 64. Further, the bell crank bracket 70 includes a bell crank bracket clevis 100 at which a bell crank (not shown) is installed to actuate the bleed valve 62.

Figure 8:
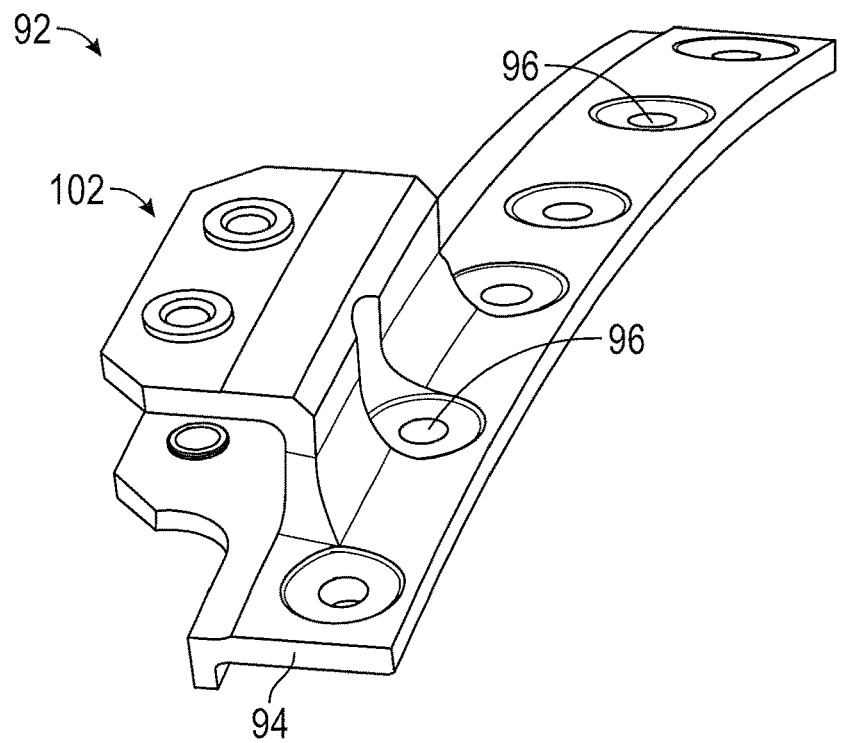
FIG. 8 is a perspective view of an embodiment of a sync bracket.
Figure 9:
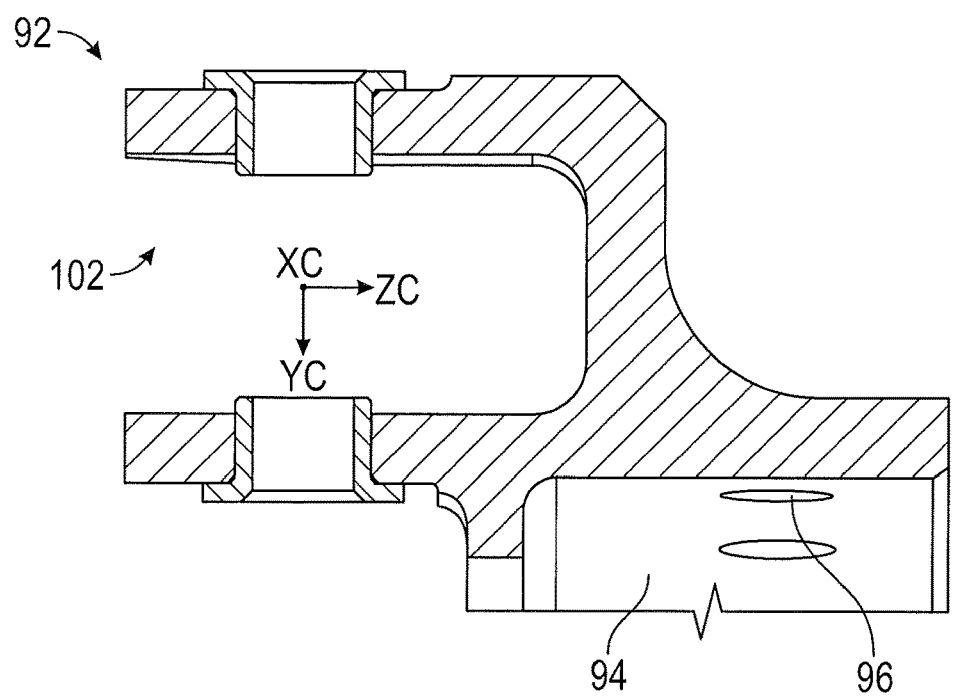
FIG. 9 is a cross-sectional view of an embodiment of a sync bracket.

Similarly, an embodiment of a sync bracket 92 is illustrated in FIGS. 8 and 9. The sync bracket 92 includes a bracket inner surface 94 that interfaces with the valve segments 64 at the segment bosses 76. In the embodiment illustrated, the sync bracket 92 is secured to the valve segments 64 by six fasteners (not shown) extending through six bracket holes 96, with each bracket hole 96 corresponding to a boss opening 98 (shown in FIG. 5) of each segment boss 76. It is to be appreciated that while six bracket holes 96 are illustrated, other quantities of bracket holes 96 may be included in the sync bracket 92 and utilized to secure the sync bracket 92 to the valve segments 64. Further, the sync bracket 92 includes a sync bracket clevis 102 at which linkage (not shown) is installed to actuate the bleed valve 62.

Figure 10:
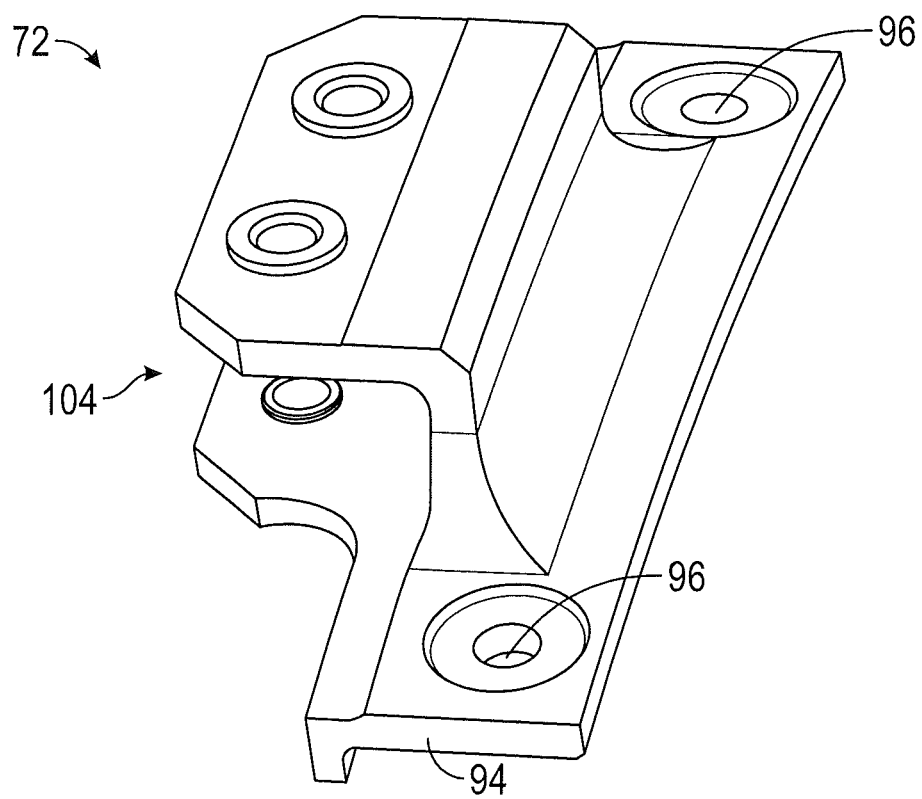
FIG. 10 is a perspective view of an embodiment of a linkage bracket.
Figure 11:
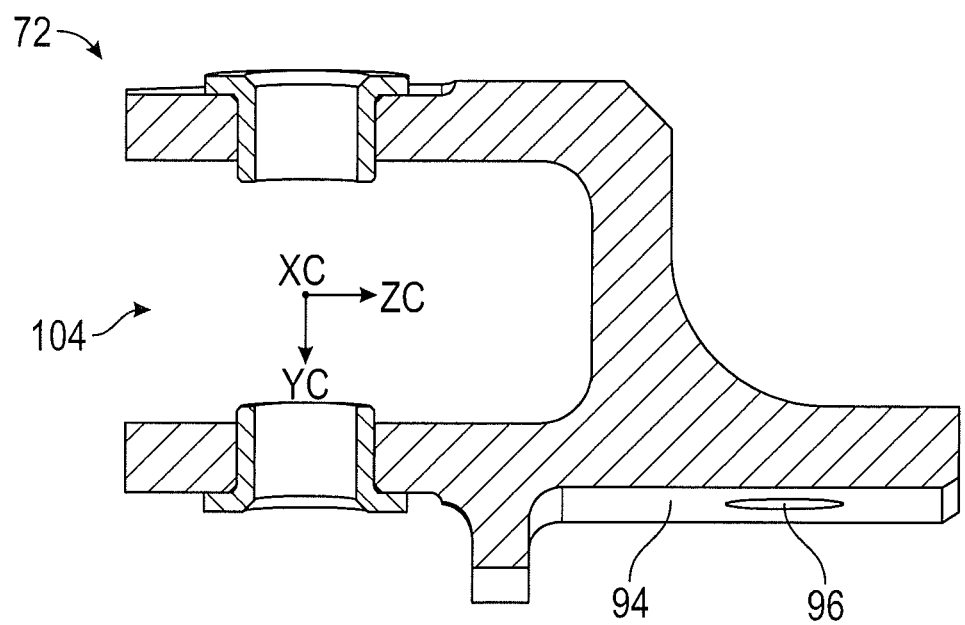
FIG. 11 is a cross-sectional view of an embodiment of a linkage bracket.

An embodiment of the linkage bracket 72 is illustrated in FIGS. 10 and 11. The linkage bracket 72 includes a bracket inner surface 94 that interfaces with the valve segments 64 at the segment bosses 76. In the embodiment illustrated, the linkage bracket 72 is secured to the valve segments 64 by two fasteners (not shown) extending through two bracket holes 96, with each bracket hole 96 corresponding to a boss opening 98 (shown in FIG. 5) of each segment boss 76. It is to be appreciated that while two bracket holes 96 are illustrated, other quantities of bracket holes 96 may be included in the linkage bracket 72 and utilized to secure the linkage bracket 72 to the valve segments 64. Further, the linkage bracket 72 includes a linkage bracket clevis 104 at which linkage (not shown) is installed to actuate the bleed valve 62.

The bleed valve 62 and bracket configuration disclosed herein provides a structurally robust bleed valve 62 while eliminating the typical full hoop valve ring, and provides necessary design clearances to surrounding parts. Further, the bracket configuration reduces weight of the bleed valve 62 and further reduces cost of the bleed valve 62 by elimination of the large valve ring forging.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A bleed valve assembly of a gas turbine engine, comprising:
    two or more valve segments extending circumferentially around a central longitudinal axis of the gas turbine engine;
    a first splice bracket spanning a first joint between a first valve segment and a second valve segment of the two or more valve segments, the first splice bracket secured to the first valve segment and the second valve segment; and
    a second splice bracket spanning a second joint between the first valve segment and the second valve segment, the second splice bracket secured to the first valve segment and the second valve segment;
    wherein the first splice bracket is secured to the first valve segment and the second valve segment via a plurality of radially-extending openings in the first valve segment and the second valve segment, the first splice bracket including complimentary splice bracket holes corresponding to the plurality of radially-extending openings, and a plurality of fasteners extending through the splice bracket holes and the plurality of radially-extending openings;
    one or more linkage brackets secured to the first valve segment and/or the second valve segment, the one or more linkage brackets disposed radially outboard of the first valve segment and/or the second valve segment; and
    where each of the valve segments of the two or more valve segments includes a plurality of segment bosses protruding radially from the valve segments, each of the plurality of segment bosses containing a respective one of the plurality of radially-extending openings.

2. The bleed valve assembly of claim 1, wherein the first joint and the second joint are disposed 180 degrees apart.

3. The bleed valve assembly of claim 1, wherein the first splice bracket and the second splice bracket are secured to the valve segments at the plurality of segment bosses.

4. The bleed valve assembly of claim 1, wherein each of the two or more valve segments each include a radial stiffening rib extending circumferentially along the valve segment.

5. The bleed valve assembly of claim 4, wherein the radial stiffening rib extends along an entire circumferential length of the valve segment.

6. The bleed valve assembly of claim 1, wherein each of the two or more valve segments each include one or more axial stiffening ribs extending from a forward segment end to rearward segment end.

7. The bleed valve assembly of claim 1, wherein the first splice bracket includes a bell crank clevis receptive of a bell crank for operation of the bleed valve assembly.

8. The bleed valve assembly valve of claim 1, wherein the second splice bracket includes a sync clevis receptive of a linkage for operation of the bleed valve assembly.

9. A gas turbine engine, comprising:
a combustor; and
a compressor located upstream of the combustor and in fluid communication therewith, the compressor including a bleed port to divert pressurized airflow from a main flowpath of the gas turbine engine, the flow through the bleed port controlled by a bleed valve, the bleed valve including:
two or more valve segments extending circumferentially around a central longitudinal axis of the gas turbine engine;
a first splice bracket spanning a first joint between a first valve segment and a second valve segment of the two or more valve segments, the first splice bracket secured to the first valve segment and the second valve segment; and
a second splice bracket spanning a second joint between the first valve segment and the second valve segment, the second splice bracket secured to the first valve segment and the second valve segment;
wherein the first splice bracket is secured to the first valve segment and the second valve segment via a plurality of radially-extending openings in the first valve segment and the second valve segment, the first splice bracket including complimentary splice bracket holes corresponding to the plurality of radially-extending openings, and a plurality of fasteners extending through the splice bracket holes and the plurality of radially-extending openings;
one or more linkage brackets secured to the first valve segment and/or the second valve segment, the one or more linkage brackets disposed radially outboard of the first valve segment and/or the second valve segment; and
where each of the valve segments of the two or more valve segments includes a plurality of segment bosses protruding radially from the valve segments, each of the plurality of segment bosses containing a respective one of the plurality of radially-extending openings.

10. The gas turbine engine of claim 9, wherein the first joint and the second joint are disposed 180 degrees apart.

11. The gas turbine engine of claim 9, wherein the first splice bracket and the second splice bracket are secured to the valve segments at the plurality of segment bosses.

12. The gas turbine engine of claim 9, wherein each of the two or more valve segments each include a radial stiffening rib extending circumferentially along the valve segment.

13. The gas turbine engine of claim 12, wherein the radial stiffening rib extends along an entire circumferential length of the valve segment.

14. The gas turbine engine of claim 9, wherein each of the two or more valve segments each include one or more axial stiffening ribs extending from a forward segment end to rearward segment end.

15. The gas turbine engine of claim 9, wherein the first splice bracket includes a bell crank clevis receptive of a bell crank for operation of the bleed valve.

16. The gas turbine engine of claim 9, wherein the second splice bracket includes a sync clevis receptive of a linkage for operation of the bleed valve.

* * * * *